June 2, 1959    C. A. PHILLIPS    2,888,965
MOUNTINGS FOR A PORTABLE ELECTRIC MOTOR
Filed Jan. 14, 1958    6 Sheets-Sheet 1

INVENTOR
CARLETON A. PHILLIPS
BY Vance E. Hoffman
ATTORNEY

June 2, 1959  C. A. PHILLIPS  2,888,965
MOUNTINGS FOR A PORTABLE ELECTRIC MOTOR
Filed Jan. 14, 1958  6 Sheets-Sheet 2
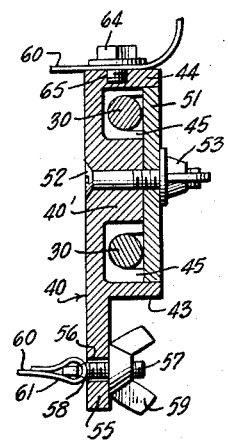
Fig. 5.
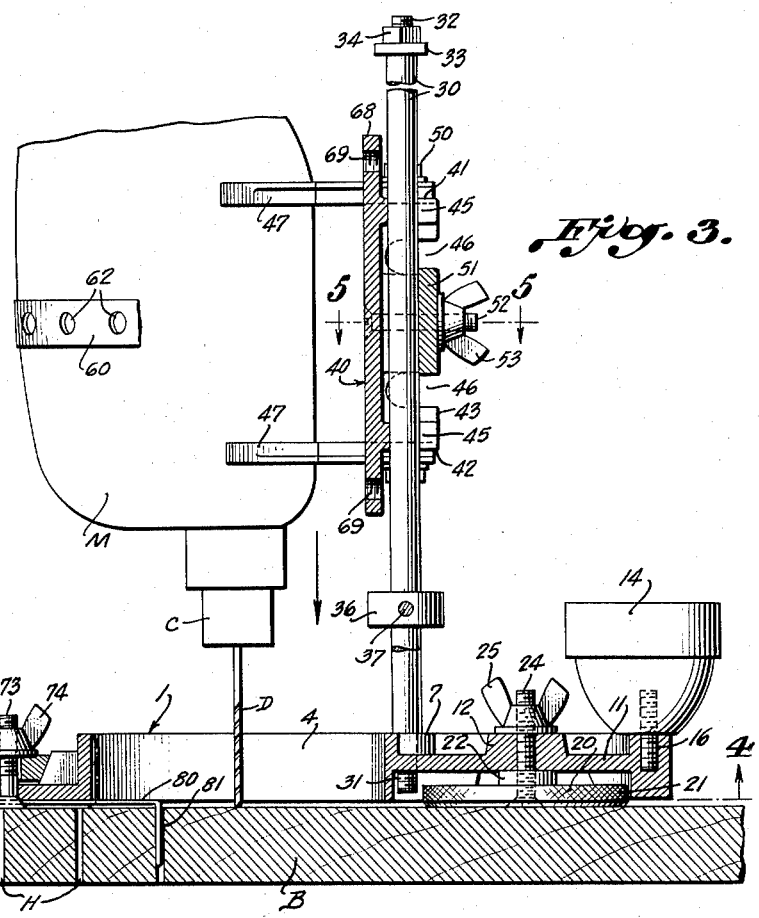
Fig. 3.
Fig. 4.
INVENTOR
CARLETON A. PHILLIPS
BY Vance E. Hoffman
ATTORNEY

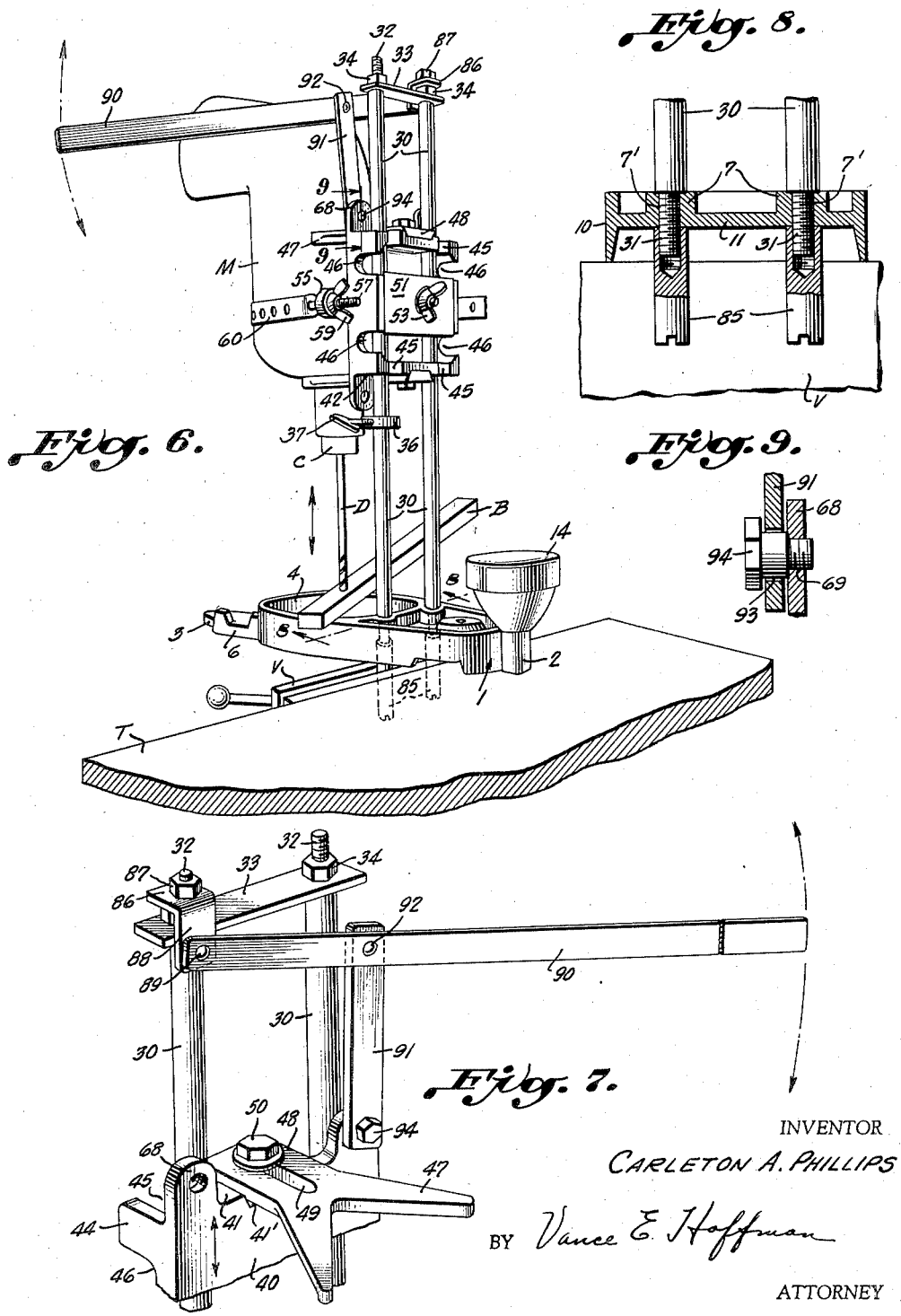

June 2, 1959　　　C. A. PHILLIPS　　　2,888,965
MOUNTINGS FOR A PORTABLE ELECTRIC MOTOR
Filed Jan. 14, 1958　　　6 Sheets-Sheet 4
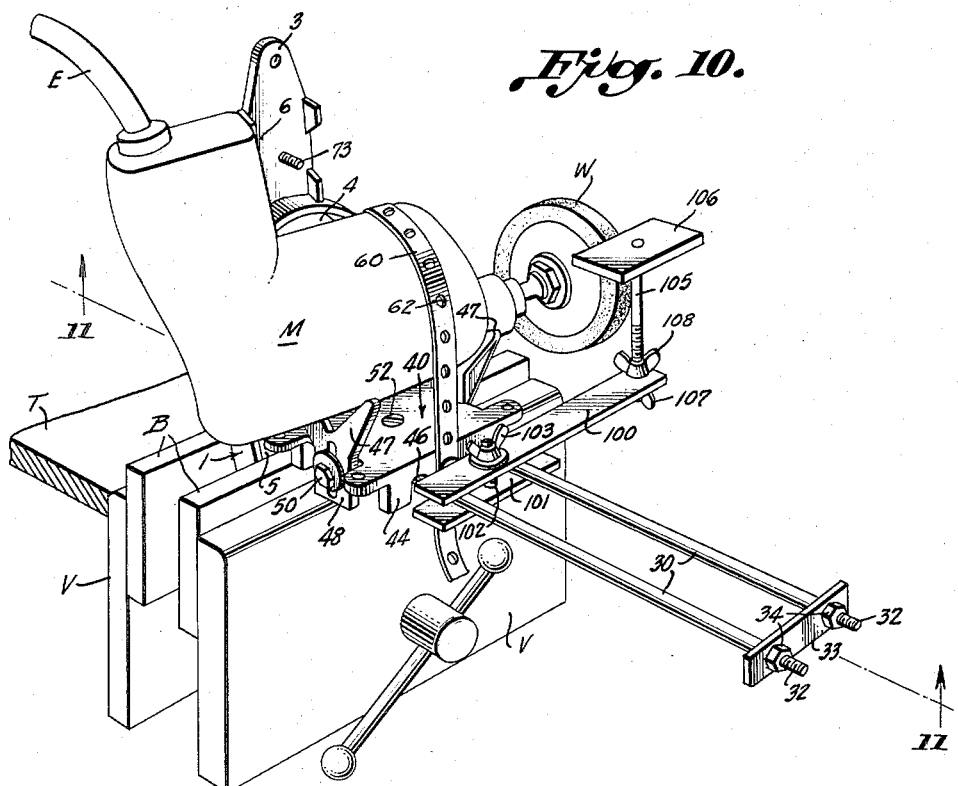
INVENTOR
CARLETON A. PHILLIPS
BY Vance E. Hoffman
ATTORNEY

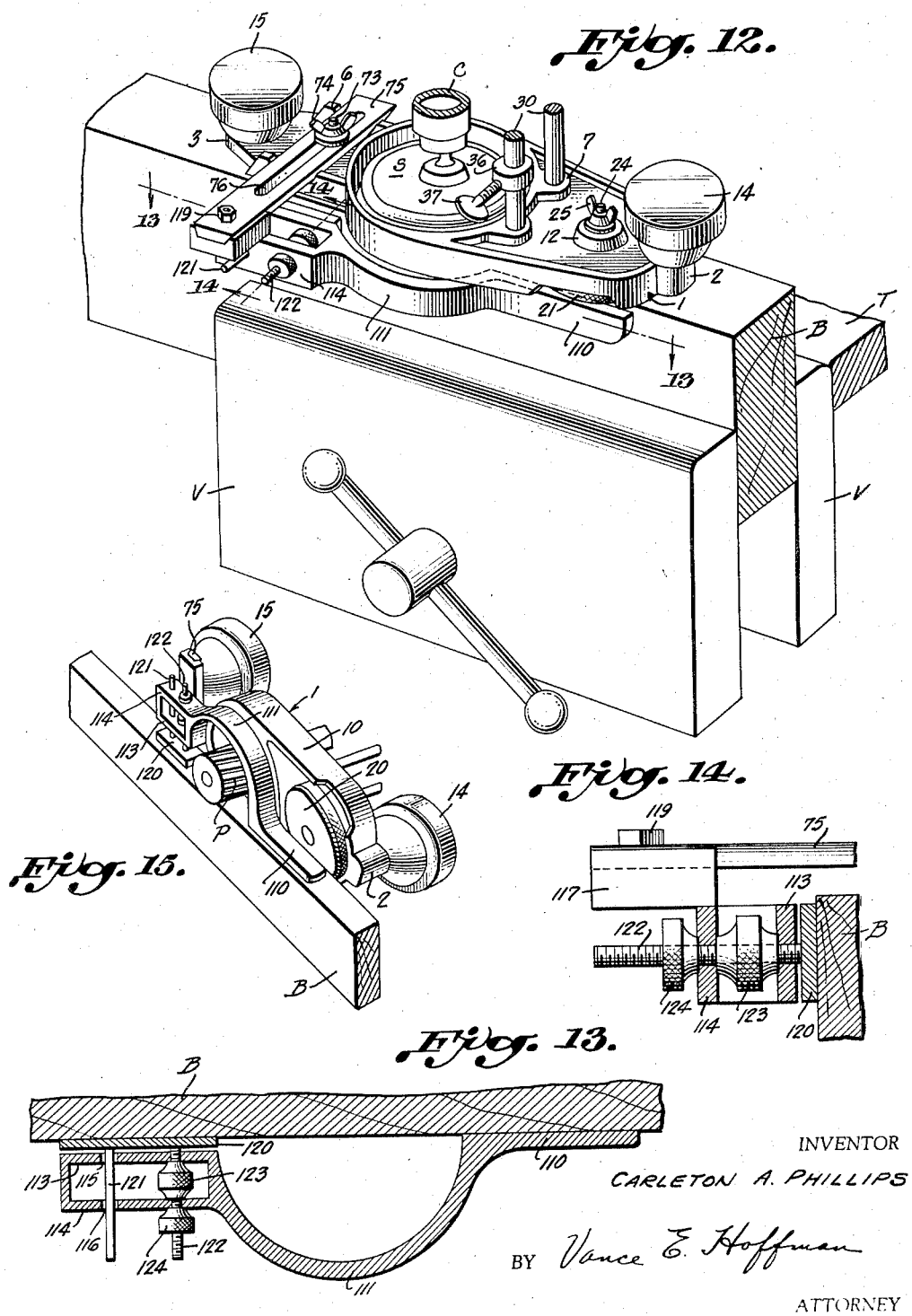

June 2, 1959        C. A. PHILLIPS        2,888,965
MOUNTINGS FOR A PORTABLE ELECTRIC MOTOR
Filed Jan. 14, 1958        6 Sheets-Sheet 6
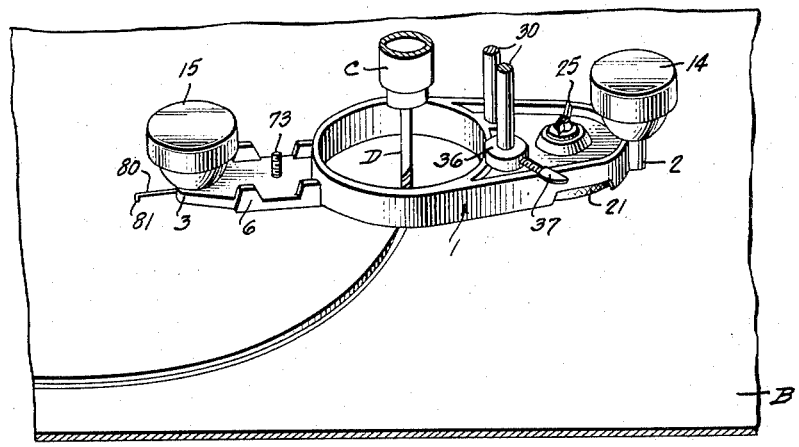
Fig. 16.
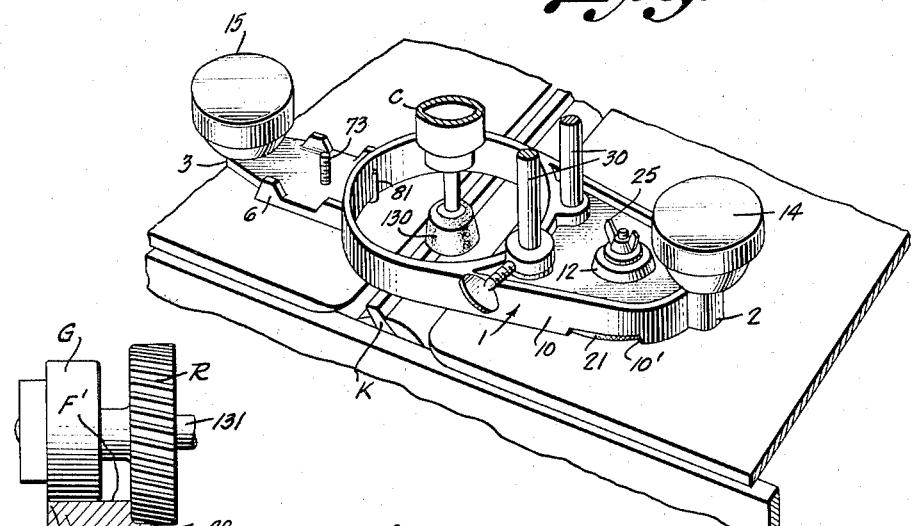
Fig. 17.
Fig. 18.
INVENTOR
CARLETON A. PHILLIPS
BY Vance E. Hoffman
ATTORNEY United States Patent Office 2,888,965
Patented June 2, 1959

2,888,965

MOUNTINGS FOR A PORTABLE ELECTRIC MOTOR

Carleton A. Phillips, Corning, N.Y.

Application January 14, 1958, Serial No. 708,923

15 Claims. (Cl. 144—1)

This invention relates to mountings for a portable electric motor adapted to have different working tools driven thereby, and more particularly to interchangeable and convertible mounting arrangements for a portable electric motor of the hand-drill type in order to adapt it to different working operations.

It is the object of the present invention to adapt a portable electric motor of the hand-drill type to perform many operations other than drilling operations, thereby to obtain a working tool capable of performing several diverse types of machine operations.

It is another object of the invention to adapt a conventional electric hand-drill for the driving of many types of tools in addition to a drill bit used as a conventional drill press or for drilling holes at uniform displacements and depths, or for executing circular or rectilinear sawing operations. The additional driven tools are designed to perform many woodworking operations such as rotary planing, edge planing or shaping, and surface sanding. Also, the assembly may be set up to drive abrasive sharpening wheels of different types.

It is another object of the invention to provide a mounting frame for the portable electric motor which is constructed of relatively few parts of low cost, and which permits the combination therewith of interchangeable attachments to adapt the electric motor to perform any of the desired working operations with a minimum amount of effort and expenditure of time in the setting up of the respective attachments for use.

The invention proceeds upon the principle of providing a mounting frame for a portable hand-drill motor which imposes desired constraints on the movement thereof. The mounting frame comprises a base with a guide frame extending transversely therefrom. The guide frame, preferably in the form of a pair of spaced guide rods, is adapted to have mounted thereon a movable carriage onto which may be clamped the portable electric motor. The carriage may be adjustably mounted on the guide rods for controlled movement therealong, or may be clamped onto said guide rods in different ways in dependence upon the work sought to be performed by the electric motor and the tool detachably mounted in the chuck thereof. Special structural features are incorporated in the base and special attachments may be combined with the base, or with the spaced guide rods and carriage, to execute many different tool working operations with different tools mounted in the chuck of the electric motor, as more fully explained hereinafter.

Other objects and purposes will appear from the detailed description of the invention following hereinafter, taken in conjunction with the accompanying drawings, wherein Fig. 1 is a perspective view of the mounting for the portable electric motor in the course of drilling a plurality of spaced holes along a straight line with a predetermined spacing and depth control of the holes;

Fig. 3 is a longitudinal sectional view of the arrangement shown in Fig. 1 with certain parts in elevation;

Fig. 4 is a bottom view of the motor mounting along line 4—4 of Fig. 3;

Fig. 5 is a horizontal sectional view along line 5—5 of Fig. 3;

Fig. 6 is a perspective view of the motor mounting when the apparatus is set up to simulate a drill press;

Fig. 7 is a perspective view of the lever assembly connected between the upper end of the guide frame and the movable carriage to control the vertical reciprocating movements of the motor and drill bit mounted therein;

Fig. 8 is a vertical sectional view of the base along line 8—8 of Fig. 6, illustrating the bottom extensions from the guide rods for clamping in a vise;

Fig. 9 is a vertical sectional view along line 9—9 of Fig. 6;

Fig. 10 is a perspective view of the portable motor mounting a grinding wheel, with the base of the assembly being clamped in a vise;

Fig. 11 is a bottom view of Fig. 10, along line 11—11;

Fig. 12 is a perspective view of the lower end of the motor mounting with the motor chuck carrying either a disc sander or a rotary planer head for sanding or planing, respectively, the edge of a board;

Fig. 13 is a horizontal sectional view along line 13—13 of Fig. 12 showing a modified square for controlling the movement of the base and tool along the board, and illustrating a variation of the square shown in Fig. 1;

Fig. 14 is a vertical sectional view along line 14—14 of Fig. 12;

Fig. 15 is a perspective view of the base of the motor mounting assembly, mounting a special rotary cutting tool for planing the edge of a board a predetermined amount;

Fig. 16 is a perspective view of a lower end of the motor mounting adapted to execute a circular sawing operation;

Figure 1:
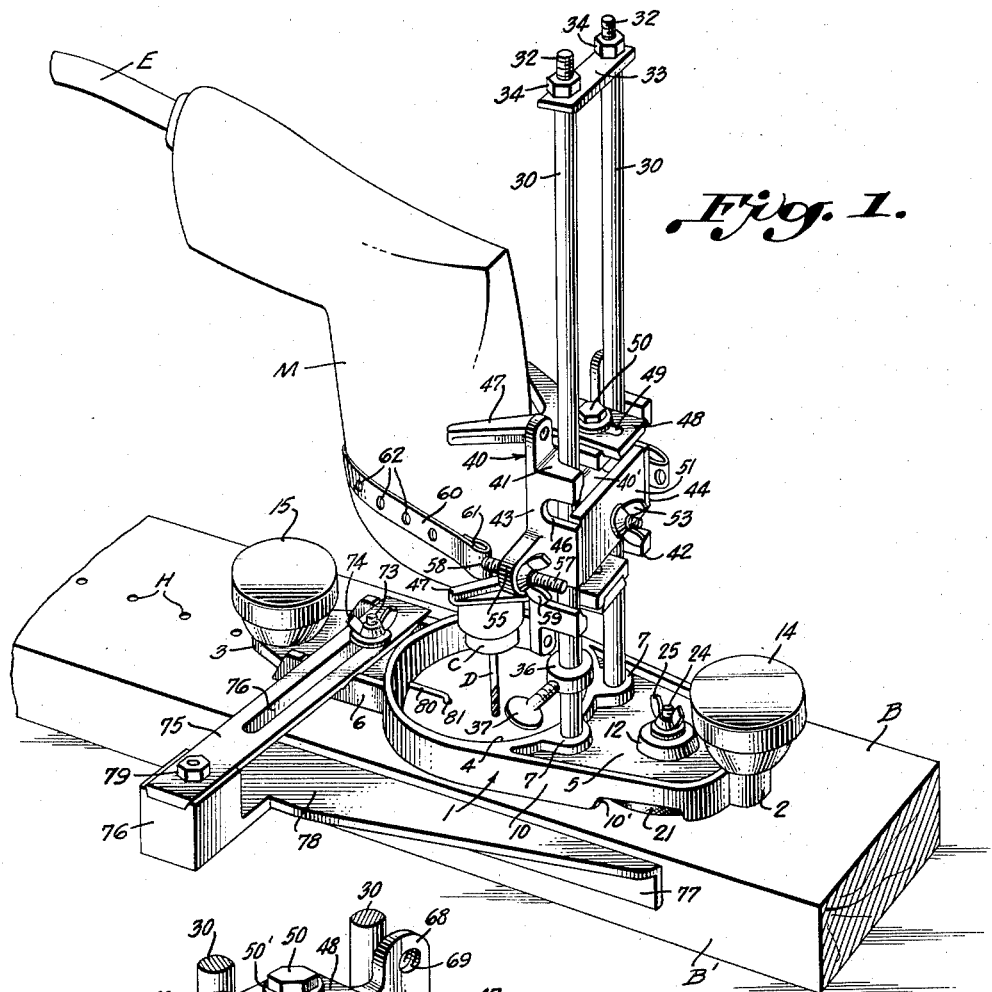
Figure 2:
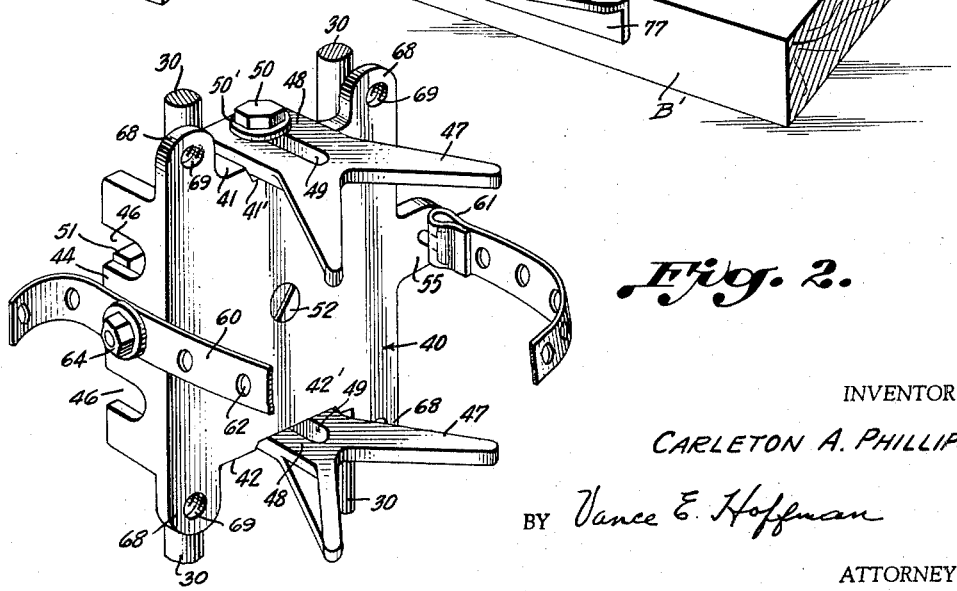
Fig. 2 is a frontal perspective view with certain parts removed, in the interest of clarity, illustrating the carriage for supporting the portable motor for clamping on or movement along the spaced guide rods.

Fig. 17 is a perspective view of the lower end of the motor mounting with the electric motor chuck supporting a cup grinding wheel for the sharpening of jointer knives; and Fig. 18 is a vertical sectional view of the base of the motor mounting assembly illustrating a variation from that shown in Fig. 15 for forming a step cut in the edge of a board by the adjustable control of the guide table or disc projecting from the bottom of the base.

As shown in the drawings, the portable electric motor M is of the conventional electric drill type formed with a hand-grip and adapted to be energized by means of an electric cord E which is plugged into a suitable socket and the operation of which may be controlled by any suitable trigger switch or the like, as is well known in the art. These electric motors are generally adapted to detachably mount drill bits D of different sizes within the chuck C. It is the object of the present invention to expand the spheres of utility of such electric drills by enabling them to perform many different shop operations, several of which are different from drilling operations. In order to execute these adaptations, several attachments are provided for interchangeable and cooperative action.

The attachment which is used universally in order to make possible the different machine operations is a carriage onto which may be clamped the portable electric motor. The carriage with the motor clamped thereto is adapted for fixing to or controlled movement along a guide frame in a direction parallel to the axis of the motor chuck and the tool carried therein, which guide frame extends from a suitable base.

As shown in Figs. 1 to 5, the base 1 of the motor mounting is preferably cast of metal and is of generally ovoid shape, having a boss 2 at one end thereof and a rounded end 3 at the opposite end thereof. The base is provided with a circular opening 4 at the midportion thereof below the field of operation of the tool driven by the motor M thereabove. The portion 5 of the base between the end boss 2 and the circular opening 4 serves to seat an adjusting plate or spacing disc 20, described in greater detail below, and, in addition, has a pair of upstanding bosses 7 on the upper surface provided with threaded bores 7' for the purpose of threadedly mounting the lower ends 31 of a pair of spaced guide rods 30 extending upwardly therefrom. These guide rods are preferably cylindrical, terminating in threaded ends 32 of reduced diameter, to permit the seating of a top cross-brace 33 on the shoulders of the cylindrical guide rods 30, which cross-brace is maintained in place by fastening bolts 34 threaded onto the ends 32 into engagement with the brace 33.

The carriage 40 for the portable motor M is designed to travel along the guide frame, and it may be selectively clamped thereto in any desired position. As shown clearly in Figs. 2 and 5, this carriage is preferably formed of an integral casting of generally rectangular outline having a substantially plane front face, (Fig. 2), and four rectangular walls extending from the rear face thereof. The top and bottom walls 41 and 42 are provided with aligned grooves or recesses 45 displaced from each other corresponding to the displacement of the rods 30 extending upwardly from the threaded bosses 7 of the base. In addition, the lateral walls 43 and 44 are likewise provided with aligned grooves 46 having a corresponding displacement, which are used for mounting the motor with its rotary axis transverse to the longitudinal axis of the guide rods 30 as is the case with the mounting shown in Figs. 10 and 11, described in greater detail below.

The top wall 41 of the carriage 40 is recessed at its central portion 41' (Fig. 2), for the purpose of adjustably seating therein a Y-shaped supporting member 47 extending forwardly of the smooth face of the carriage 40. The shank 48 of this member is provided with a longitudinal slot 49 which accommodates a bolt 50 together with a lock washer 50' which is threaded into the body of the top wall 41.

The central portion of the bottom wall 42 is similarly recessed at 42' for the reception of the shank 48 of another Y-shaped end piece which is maintained against the bottom wall by another bolt and lock washer. The longitudinal slots 49 permit an adjustment of these end pieces in order to seat most effectively the curved body of the electric motor M thereagainst, in view of the different contours of these motors as produced by different manufacturers.

In order to clamp the portable motor M onto the carriage, a lug 55 extends from the base of the carriage adjacent to the lateral wall 43 at approximately the midportion thereof. An opening 56 in this lug (Fig. 5), accommodates a threaded bolt 57 provided with a slot 58 at one end thereof for receiving the loop 61 of a flexible metallic band 60 provided with a plurality of apertures 62 therein. The thumb nut 59 is designed to engage the end of the bolt 57 opposite the recess 58 and the opposite end of the flexible band 60 is affixed to the opposite lateral wall 44 of the carriage by the engagement of bolt 64 and lock washer within threaded recess 65 provided in the lateral wall 44. The hole 62 in closest proximity to the bore 65 is penetrated by the bolt 64 which depends upon the girth of the portable motor being used, and thereafter the band may be clamped tightly by tightening the thumb nut 59 at the opposite end thereof.

The carriage is adapted to be clamped to the guide frame by means of rectangular locking plate 51 fitting between the rear walls of the carriage whereat is provided a central boss 40' extending rearwardly from the base 40. A flat-headed bolt 52 extends through a cylindrival bore in the central boss 40' from a countersunk recess on the front face of the carriage and through a central opening in locking plate 51, for engagement with a lock washer and thumb-nut 53. By tightening this nut, the carriage may be clamped to the guide frame at any selected position, and upon the loosening of this thumb-nut the carriage may slide along the guide frame by virtue of the constrained movement of the recesses 45 along the guide rods 30.

The adjusting plate or table 20 disposed in the underside of the portion 5 of the base, to which reference is made above, consists of a circular disc having a smooth bottom face with a knurled peripheral edge 21. A flat-headed bolt 24 is fixedly secured in the disc and extends upwardly therethrough through a boss 22 on the upper face of the disc for threaded engagement with the internally threaded boss 12 cast on the upper side of the base from the horizontal partition 11. The knurled edge 21 of the disc 20 permits an easy rotation thereof to control the protrusion of the disc relative to the bottom edge of the base 1 and lateral flange 10 circumscribing parts 2, 4 and 5 of the base. Cut-outs 10' on opposite sides of the flange afford easy access to the knurled edge 21 of the rotatable plate. The periphery of the bottom face of the disc is chamfered slightly to assure a smooth bearing surface on the main area of the disc. When the top edge of the base 22 is in contact with the bottom surface of the partition 11, the disc protrudes slightly below the bottom edge of the flange 10 and is at the same level of the base 1 as are the portions 3 and 6 at the opposite end thereof. This setting of the disc may be fixed by the provision of thumb-nut 25 with a washer cooperating with the free end of the flat-headed bolt 24 to retain the disc in set position. When it is desired to project the circular table 20 beyond the plane of the bottom edge of the base, for use as described in greater detail below, the thumb-nut 25 is backed-off from the bolt 24 to permit rotation of the table within its threaded bore, and at a predetermined setting beyond the bottom of the flange 10, the thumb-nut 25 may be re-advanced into contact with the base 12 to maintain the setting in place.

Knob 14, at the end of the base adjacent to the portion 5, is threaded interiorly to accommodate dowl bolt 16, the opposite end of which may be threaded into a correspondingly threaded bore in the end boss 2. Thus, this knob may be conveniently detached wherever desired.

The knob 15 on the opposite end of the base is likewise interiorly threaded at the bottom thereof for the accommodation of a dowel bolt 17 which is provided with a diametral bore 71 at the lower end thereof. A slot 70 extends longitudinally of the bottom of the base at portion 6 thereof from the rounded end 3 to the circular portion 4, which, as described above, protrudes approximately ⅛" below the flange 10 of the base at portions 2, 4 and 5. This slot is in alignment with the notch 72 in the head of a flat-headed bolt 73 which extends upwardly from the bottom of the base 6. This bolt 73 serves to clamp one arm 75 of a square, which arm is provided with a longitudinal slot 76 extending longitudinally thereof for purposes of adjustment. This arm 75 is of trapezoidal cross-section and is adapted for mounting transversely of the longitudinal axis of the base within correspondingly-shaped recesses in the opposite flanges extending upwardly from the portions 6 and 76 respectively.

The cooperating rectangular guide arm 77 of the square, having a reinforcing flange 78, is fitted with a post 76 at one end thereof, which is recessed at the top for receiving the end of the arm 75, and the two rectangularly extending arms 75 and 77 are rigidly connected together by means of bolt 79. In effect, the arms 75 and 77 constitute a form of try-square which may be adjustably clamped to the upper face of the base at portion 6 with the edge 77 adjustably disposed relative to the longitudinal axis of the base extending from the centers of knobs 14 and 15. The clamping of the square may be executed by means of thumb-nut 74 cooperating with the free end of the flat-headed bolt 73 to press the washer 74' against the upper face of arm 75 at any desired point of the longitudinal slot 76.

The arrangement illustrated in Figs. 1 to 5 permits a plurality of holes H to be drilled along a piece of lumber B with a uniform spacing between the holes from one of the edges of the piece of lumber and with a uniform depth of each hole. An indexing needle 80 consisting of a longitudinal piece of wire with a transverse offset 81 is used for this purpose. This indexing wire is seated in the slot 70 at the bottom of the base and passes through the notch 72 in the head of bolt 73 as well as through the diametral opening in the dowel bolt 17 whereat it is clamped by the knob 15. After locating and drilling the first hole H, end 81, facing downwardly, is inserted therein, and upon loosening knob 15, the base may be shifted relative to the drilled hole to dispose the rotary axis of the drill bit D, which is fastened in chuck C in the portable motor, to space the next hole at any desired distance from the first hole. Thereafter, knob 15 is re-tightened in order to maintain constant this displacement. Furthermore, the displacement of the drill holes from the edge B' of the board B may be adjusted by setting the arm 77 of the guide member along one of the smooth edges of the board and adjustably fixing the arm 75 relative to the longitudinal axis of the base by clamping thumb screw 74 against the upper face of the arm 75. Thereafter, movement of the base is constrained along a straight line with a fixed displacement from the edge B' of the board B.

The carriage 40 for the portable motor is loosely mounted on the guide frame rods 30 by loosely fitting clamping plate 51 onto the guide rods by means of the clamping thumb-screw 53. Thereby the motor M may be reciprocated in a vertical direction by the operator. The depth of the cut may be set and controlled by means of adjusting collar 36 disposed on one of the guide rods 30 which is fixed in place by means of set screw 37 and which cooperates with the bottom wall 42 of the carriage to stop its downward movement at any desired point. The limiting collar may span both guide rods, if desired. Thus, as shown in Fig. 1, the penetration of offset 81 of the indexing needle into the preceding hole assures the desired spacing of the next hole which is controlled by the downward movement of the motor until the same is stopped by the collar 36 whereupon the carriage is lifted, the base shifted over another increment to dispose the offset 81 into the hole last drilled for a repeated operation. While the holes H in Fig. 1 are shown extending through the entire thickness of the board B, the depth of penetration may be limited by clamping the stop collar 36 in a higher position.

In order to use the base guide frame and carriage as a form of drill press, a pair of female studs 85 are threaded upon the threaded extremities 31 of the guide rods 30 which protrude beyond the horizontal partition 11 of the base. Thereupon these studs may be clamped between the jaws of a vise V as shown in Figs. 6 and 8.

A special attachment in the form of a jointed lever assembly is connected between the guide frame and the movable carriage 40 to control the reciprocating movements of the carriage so that the drill D may be brought into cooperative action with the board B resting upon the central portion 4 of the base 1. This jointed linkage system consists of an angular bracket 86 having its horizontal arm provided with an aperture fitting over the threaded upper extremity 32 of one of the guide rods 30. The vertical arm of the bracket has pivotally jointed thereto actuating lever 90 at pivot 89, and short lever 91 is pivotally jointed to lever 90 at 92, a short distance from the pivot 89. The opposite free end of lever 91 is apertured at 93 (Figs. 7 and 9), for receiving a cap bolt 94, the free end of which threadedly engages the threaded opening 69 in the top lug 68 of the carriage frame, remote from the guide rod supporting the extreme pivotal joint 89 of the actuating arm 90. As shown in Fig. 6, the up and down rocking movements of lever arm 90 effects a vertical reciprocating movement of the carriage 40 and the motor M seated and clamped thereon. The lower limit of the reciprocating movement of the drill D may be controlled, in this case as well, by clamping the limiting collar 36 on guide rod 30 by means of set screw 37 so that it will stop the movement of the carriage at a predetermined limit of its travel, that is, when bottom wall 42 encounters the collar 36.

Figs. 10 and 11 illustrate the adaptability of the motor mounting for driving an abrasive wheel W by the portable motor M for the purpose of sharpening tools or performing any other desired grinding operations. In this arrangement, the knobs 14 and 15 as well as the rotary disc 20 with the clamping bolt and nut 24, 25 are removed from the base 1, and the base is clamped between boards B and in the vise at the portions 2 and 5 thereof, as clearly shown in Fig. 10. The motor M is seated upon the saddle elements 47 as in the other arrangements and clamped by means of a flexible band 60. However, in this adaptation of the invention, the carriage 40 is supported on the guide frame 30 disposed in a horizontal position and the carriage is clamped to the guide frame by means of the locking plate 51 and the claming nut 53 in a direction transverse to that illustrated in the previous figures. Thus, the recesses 46 in the lateral walls 43 and 44 accommodate the guide rods 30 rather than the recesses 45 in the top and bottom walls 41 and 42, as was the case in the embodiments described heretofore.

A special lever assembly is adapted to be mounted on the guide frame 30 for the purpose of providing a working surface 106 adjacent to the grinding wheel, which may serve as a support for the tools being sharpened thereby. A short lever plate 101 serves to clamp the long lever plate 100 by means of a bolt 102 and a nut 103 extending between the two lever plates and between the guide rods 30, as clearly shown in Fig. 10. The free end of lever 100 is apertured and detachably carries the post 105, onto one end of which is rigidly mounted the table support 106. Thumb nuts 107 and 108 cooperate with the threads on the opposite end of post 105, on the opposite sides of the plate 100, to fix the post 105 in vertical upstanding position. The height of support 106 may be adjusted by varying the portion of the threaded post 105 which is adjacent to the lever plate 100.

As may be readily seen by the perspective view shown in Fig. 10 and the bottom view shown in Fig. 11, the simple lever attachments supplementing the main mounting frame and the carriage supporting the motor enhances the utility of the conventional electric drill by providing a fixed abrasive wheel assembly which is highly useful in a workshop.

Many operations besides drilling may be performed by the motor mounting and base when assembled as shown in Figs. 1 to 5. The substitution of a disc sander S for the drill D permits sanding operations to be performed as the base is moved along the surface of a board by grasping the knobs 14 and 15 and by moving the assembly along a predetermined surface. The sanding depth may be controlled by adjusting the stop collar 36 on one of the guide rods 30 by means of the set screw 37. Such an arrangement is illustrated in Fig. 12, showing the sanding of the top edge of a board B mounted in a vise V.

Alternatively the disc-shaped tool S in Fig. 12 may be a rotary planer head. In this case, the cutting edges of the planer head are adjusted to correspond in height with the base at portions 3 and 6. This is done by sliding the carriage and motor up or down until the proper position is reached and then locking the carriage in place by tightening the wing nut and lock washer against locking plate 51. A guiding square is usually used with this set-up. The depth of cut may be controlled by raising or lowering the leveling disc 20. Thus, if the disc 20 is projected a maximum amount at the start, by means of clamping bolt 25, the withdrawal of the disc into the underside of the base effects a relatively increased depth of cut by the rotary planer head S.

In order to control the movement of the base 1 along the edge parallel to a face of the board, a guide member 110 may be fastened to the base 1; and this member, as shown in Figs. 12 to 14, presents a variation of the guide member shown in Fig. 1. While the arm 75, which is clamped to portion 6 of the base 1 by means of bolt 73, and thumb nut 74 are the same as that shown in Fig. 1, the guiding arm 110 is provided with a discontinuous straight edge, the opposite ends of which are relatively adjustable, and is curved at the intermediate portion 111 corresponding to the circular configuration of the intermediate portion of the base in which circular area 4 is accommodated the rotary tool S. One end 120 of the perpendicular arm below slotted arm 75, is movable relatively to the fixed portion 110 of the guide arm, permitting the two ends 110 and 120 to be in alignment, as is shown in Figs. 12 to 14, or permitting an offset between them as may be desirable in the case of some woodworking operations. Thus, the portion of the perpendicular arm which is adjacent the mounting thereof with arm 75 by means of bolt 119 is provided with a pair of spaced walls 113 and 114 adjacent to guide member 120. Apertures 115 and 116 are provided in walls 113, 114, respectively, for the accommodation of a guide post 21 extending from arm 120. Threaded bolt 122 extends from another point of arm 120 and supports adjusting nuts 123 and 124, the rotation of the former serving to vary the displacement of arm 120 with respect to the main portion of the guide arm 110, 111, while the latter locks the piece 120 in adjusted position.

With the parts as shown in Figs. 13 and 14, with arm 110 and 120 in alignment, the functions performed by the guide arm are identical to the function performed by the guide arm shown in Fig. 1, which is similar to the function of a conventional try-square. However, when an edge planing operation is sought to be performed, as is illustrated in Fig. 15, wherein a rotary planing tool P is mounted in the arbor of the motor M, the portion 120 of the guide arm is projected from the main portion of the guide arm a predetermined extent corresponding to the depth of the cut sought to be performed by the planing tool, so that a part 110 serves to guide the base of the tool at the portion of the board prior to the cutting thereof while the portion 120 of the guide arm serves to guide the tool at the part thereof after the edge has been planed down by the cutter tool P. The curved portion of the arm 111 permits the projection of the tool into the field of operation thereof without interference, as the same extends through the opening 4 in the base. As shown in Fig. 15, the operator grasps the base of the tool by the knobs 14 and 15 and moves the same downwardly to effect the desired edge planing operation. With the execution of a one-eighth inch cut by the rotary planer P, guide 120 is projected one-eighth inch beyond guide end 110.

Fig. 16 illustrates the adaptability of the tool to make a circular cut. In this instance, the indexing lever or needle 80 is clamped to the knob 15 in recess 70 of the base portions 3 and 6 and diametral bore 71 of dowel bolt 17 to present the lateral offset 81 within a small opening representing the center of the circle. With the center fixed, the radius may be adjusted to present the rotary drill D at the point of the cutting circumference. The base of the tool is moved about the center 81 to effect the cutting of a perfect circle from a sheet of material B.

A sawing operation may be performed along straight line cuts by the use of a guide arm 77, as disclosed in Fig. 1 or guide arm 110 as disclosed in Fig. 12, in which case the continuous movement of the drill D along a straight line would perform the desired rectilinear sawing operation.

Fig. 17 illustrates the sharpening of jointer knives K mounted in a work table by the movement of the motor mounting along the knives being shapened. As shown, a cup grinding wheel 130 is mounted in the chuck C which effects a sharpening of the knives K which are fixedly clamped as the base and rotary tool are moved thereacross by grasping the knobs 14 and 15.

In Fig. 18 is shown an arrangement for making a step cut along the edge of a board B which may be clamped in a vise. The set-up is similar to that shown in Fig. 15, except for the fact that the cutting tool R, which is mounted on shank 131, is of the desired configuration and depth and carries therewith a guide roller G moving along the edge of the board. The protrusion of the disc table 20, by extending the same from the supporting partition 11, serves to limit the depth of the cut into the side F of the board which is performed by the cutting tool. As explained above, the threaded bolt 24 adjustably mounted in the threaded bore of the boss 12 makes possible an adjustment of the table disc 20 with respect to the base, which adjustment is set in fixed position by means of the clamping bolt 25, thereby the base of the tool may be moved along the face of the board while effecting a predetermined depth of cut by means of the cutter R. The guide roller G which is mounted on the tool shank 131 beyond the cutter R may be of different diameters for the purpose of variably controlling the depth of cut into the top edge F' of the board F.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:

1. A mounting for a portable electric motor adapted to have a working tool driven thereby, comprising a pair of rigidly mounted spaced guide rods, a carriage adjustably mounted on said guide rods with slots on the rear of said carriage spaced correspondingly to the spacing of said rods for sliding movement therealong, said carriage comprising an integral casting having a plain front face with four rectangularly arranged walls projecting rearwardly therefrom having slots of predetermined spacing to permit the selective mounting of said carriage onto said guide rods in transverse directions and having at least some of its walls provided with threaded bores for the accommodation of threaded bolts to effect the seating and clamping of the portable electric motor thereon, and and a flexible strap extending from opposite sides of said carriage and around the body of said electric motor to detachably clamp the motor to said carriage.

2. A mounting for a portable electric motor adapted to have a rotary drill driven thereby, comprising a base, a guide frame extending upwardly from said base, a carriage adjustably mounted on said guide frame, a saddle on said carriage for seating the electric motor, a flexible strap extending from opposite sides of said carriage and around a portion of the electric motor to clamp the motor to said carriage, a square having one arm mounted transversely on said base with the other perpendicular arm adapted to contact the edge of a workpiece, and adjustable indexing means mounted on the bottom of said base along the longitudinal axis thereof and comprising a downwardly directed point for engagement with a hole in the piece for successively indexing the point of penetration of the rotary drill upon downward movement of the carriage, for successively drilling a plurality of uniformly spaced holes at a uniform displacement from the edge of the workpiece.

3. A device as set forth in claim 2 wherein a blocking element is adjustably mounted on the guide frame to control the downward limit of the carriage and the consequent depth of the holes drilled in the workpiece.

4. A mounting for a portable electric motor adapted to have an abrasive grinding wheel driven thereby, comprising a base support adapted to be clamped in a vise, a pair of rigidly-mounted spaced guide rods extending horizontally therefrom, a carriage mounted on said guide rods with slots on the rear of said carriage spaced correspondingly to the spacing of said rods for accommodation and clamping of the carriage to the guide rods, a saddle extending upwardly from said carriage at the opposite ends thereof for seating the electric motor thereon in a direction transverse to the axis of said guide rods, a flexible strap extending from opposite sides of said carriage and around the body of said electric motor to detachably clamp the motor to said carriage, a supporting bracket detachably clamped at one end thereof to said guide rods and extending therefrom in a transverse direction, and a tool support at the opposite end of said supporting bracket adjacent to the grinding wheel.

5. A device as set forth in claim 4 wherein said tool support is fixedly mounted on the upper end of a post which is threaded at the lower end thereof and which is adapted to extend through an opening at the last-mentioned end of the supporting bracket, and adjusting bolts cooperative with said threaded post above and below said bracket to fix and adjust the level of tool support relative thereto.

6. A mounting for a portable electric motor adapted to have a working tool driven thereby, comprising a base having a circular opening at the midportion thereof adjacent the field of operation of the working tool, a guide frame extending transversely from said base, a carriage adjustably mounted on said guide frame, a saddle on said carriage for seating the electric motor, a flexible strap extending from opposite sides of said carriage and around a portion of the electric motor to clamp the motor to said carriage, and a square having one arm thereof mounted on said base perpendicularly to the longitudinal axis of the base and presenting a discontinuous straight-edge on the other arm having an intermediate curved portion conforming substantially to the curvature of the circular opening in the base to afford clearance for the tool.

7. A mounting for portable electric motor adapted to have a rotary tool driven thereby, comprising a base having a holding knob at each end thereof and a circular opening at the mid-portion thereof adjacent to the field of operation of the working tool, a pair of spaced guide rods extending upwardly from said base adjacent to one side of said circular opening, a circular disc adjustably mounted in the bottom of said base between said last-mentioned side and the end of said base and means for adjusting the face of said disc relative to the bottom of said base, a carriage adjustably mounted on said spaced guide rods, a saddle on the carriage for seating the electric motor, a flexible strap extending from opposite sides of said carriage and around a portion of the electric motor to clamp the motor to said carriage, and a square having one arm thereof adjustably mounted on said base perpendicularly to the longitudinal axis thereof and on the side of the circular opening opposite from said circular disc and presenting a discontinuous straight-edge along the other arm with an intermediate curved portion conforming substantially to the curvature of the circular portion at the midportion of the base.

8. A mounting for a portable electric motor adapted to have a rotary planing tool driven thereby, comprising an ovoid-shaped base having a holding knob at each end thereof and a circular opening at the mid-portion thereof adjacent to the field of operation of the working tool, a pair of spaced guide rods extending transversely from said base adjacent to one side of said circular opening, a circular spacing disc adjustably mounted in the bottom of said base between said last-mentioned side and the end of said base and means for fixing the extent of protrusion of said disc beyond the bottom of said base, a carriage adjustably mounted on said spaced guide rods, a saddle on the carriage for seating the electric motor, a flexible strap extending from opposite sides of said carriage and around a portion of the electric motor to clamp the motor to said carriage, a square having one arm thereof adjustably mounted on said base perpendicularly to the longitudinal axis thereof and on the side of the circular opening opposite from said spacing disc and presenting a discontinuous straight edge along the other arm with an intermediate curved portion conforming substantially to the curvature of the circular portion at the midportion of the base, the ends of said straight edges being relatively displaceable in parallel planes.

9. A mounting for a portable electric motor adapted to have a rotary planer tool driven thereby with a cylindrical guide roller therebeyond, comprising a base having a holding knob at each end thereof and a circular opening at the mid-portion thereof adjacent to the field of operation of the rotary planer, a pair of spaced guide rods extending transversely from said base adjacent to one side of said circular opening, a circular spacing disc adjustably mounted in the bottom of said base between said last-mentioned side and the end of said base and means for fixing the extent of protrusion of said disc beyond the bottom of said base to adjust the depth of cut effected by the planer tool in the face of a workpiece, a carriage adjustably mounted on said spaced guide rods, a saddle on the carriage for seating the electric motor, and a flexible strap extending from opposite sides of said carriage and around a portion of the electric motor to clamp the motor to said carriage.

10. A carriage for mounting a portable motor onto a pair of longitudinally extending guide rods for sliding movement therealong or for adjustable fixation thereon, comprising a base having a saddle extending forwardly therefrom at opposite ends thereof, guide slots on said ends at the rear of said base having a displacement corresponding to the spacing between said guide rods, and a locking plate overlying the rear of said base with clamping means extending between said plate and the front of said base to retain the carriage on said guide rods for controlled adjustment thereon.

11. A device as set for in claim 9 including a flexible metallic band extending from opposite sides of said base adapted to clamp the portable motor to said carriage.

12. A device as set forth in claim 11 wherein adjustable connecting means are embodied in the flexible band to accommodate different dimensions and contours of portable motors.

13. A carriage for mounting a portable motor onto a pair of longitudinally extending guide rods for sliding movement therealong or for adjustable fixation thereon, comprising a base of substantially rectangular outline with four walls extending transversely from the rear thereof, a Y-shaped saddle having a slotted shank for adjustable mounting on each end wall with the Y-shaped saddles projecting beyond said base for seating the motor, guide slots on said end walls on each side of said shank with a displacement corresponding to the spacing between said guide rods, additional guide slots on each side wall projecting rearwardly from said base with a corresponding displacement, and a locking plate overlying the rear of said base with clamping means extending between the plate and the frontal center of said base to retain the carriage on said guide rods for controlled adjustment thereon.

14. A squaring tool having one arm for detachable mounting on a base, a second arm mounted to one end of said first arm perpendicularly thereto, said second arm having two straight planar end portions with an arcuate portion therebetween to afford clearance for a working tool, and means for adjusting one of said end portions to adjust the displacement of the planes containing said end portions or to render them co-planar.

15. A mounting for a portable electric motor adapted to have a working tool driven thereby, comprising a base, a guide frame extending transversely from said base, a carriage adjustably mounted on said guide frame, a saddle on said carriage for seating the electric motor, a flexible strap extending from opposite sides of said carriage and around a portion of the electric motor to clamp the motor to said carriage, and an adjustable indexing lever in a centering hole, said lever projecting beyond one end of said base and displaceable with respect to the axis of the working tool to constitute an adjustable radius for a circular cutter when the working tool assumes the form of a rotary drill bit.

References Cited in the file of this patent

UNITED STATES PATENTS

| | | |
|---|---|---|
| 1,865,576 | Luginbuhl | July 5, 1932 |
| 2,309,777 | Kowalske | Feb. 2, 1943 |
| 2,483,060 | Niedelman et al. | Sept. 27, 1949 |
| 2,777,485 | Farrow | Jan. 15, 1957 |
| 2,800,933 | Michael | July 30, 1957 |
| 2,805,691 | Medal | Sept. 10, 1957 |

FOREIGN PATENTS

| | | |
|---|---|---|
| 702,854 | Germany | Jan. 23, 1941 |